(No Model.)
J. DICE.
COMMUTATOR.
No. 550,407. Patented Nov. 26, 1895.
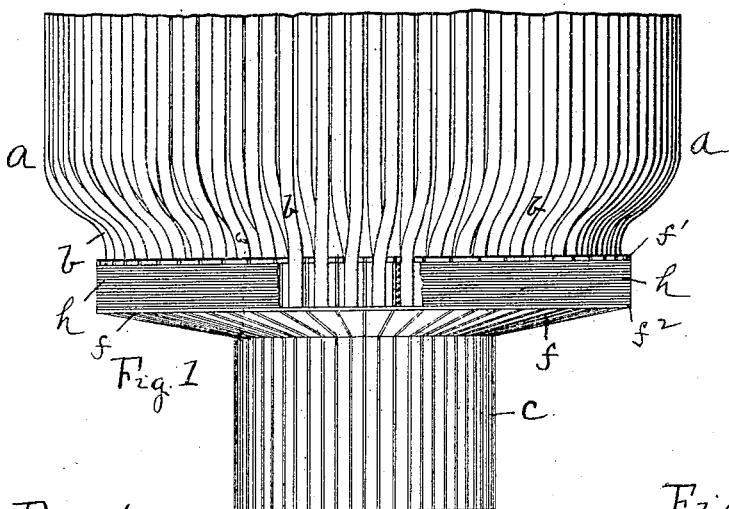
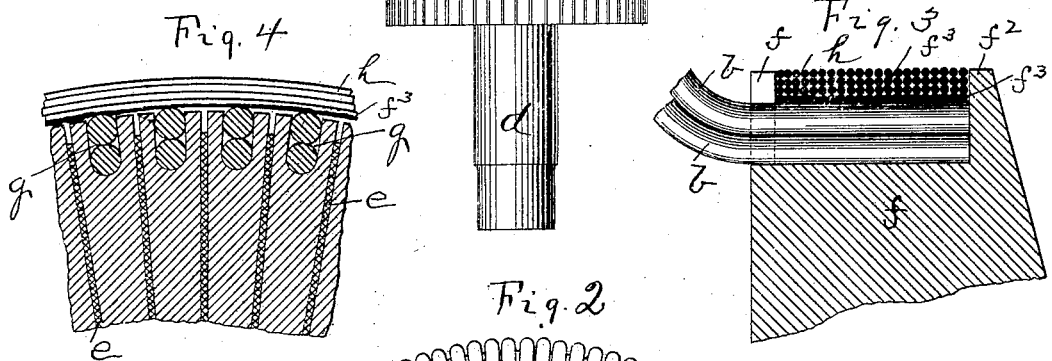
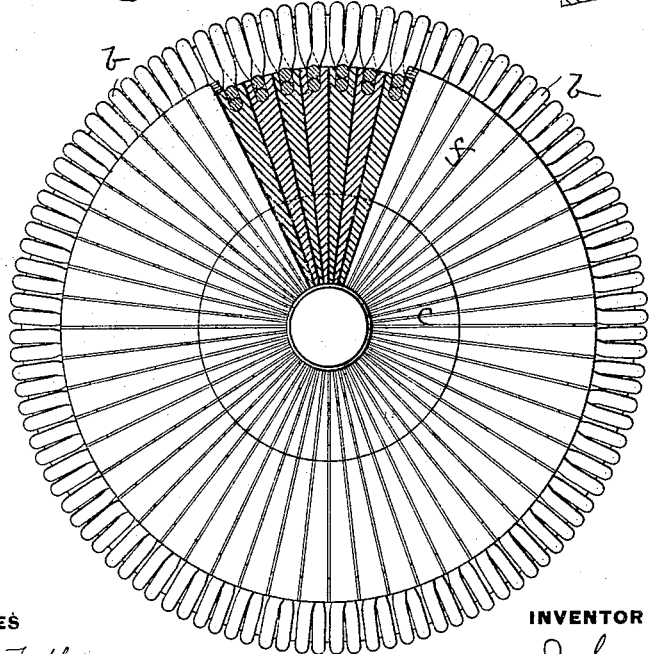
WITNESSES
Robert C. Totten
Chas. J. Farrar.
INVENTOR
John Dice
By Kay & Totten
attys.

UNITED STATES PATENT OFFICE.

JOHN DICE, OF WILKINSBURG, PENNSYLVANIA.

COMMUTATOR.

SPECIFICATION forming part of Letters Patent No. 550,407, dated November 26, 1895.

Application filed August 21, 1895. Serial No. 559,974. (No model.)

*To all whom it may concern:*

Be it known that I, JOHN DICE, a resident of Wilkinsburg, in the county of Allegheny and State of Pennsylvania, have invented a new and useful Improvement in Commutators; and I do hereby declare the following to be a full, clear, and exact description thereof.

My invention relates to electric motors and dynamos, and has special reference to the retaining of the wires leading from the armature to the commutator in position.

Heretofore in the construction of motors and dynamos it has been generally customary to introduce the ends of the wires on the armature into the grooves in the periphery of the commutator and to secure said wires in said grooves by means of a composition of lead and Babbitt metal poured in around said wires. This construction has several serious objections, as the metal is liable to melt under the high speed at which the commutator revolves, and at the same time the particles of metal are liable to be thrown into the coils of the armature, which results in the burning out of the motor.

The object of my invention is to provide means for securely holding the ends of the armature-wires in place, and the invention comprises certain details of construction, all of which will be fully hereinafter set forth and claimed.

To enable others skilled in the art to make and use my invention, I will describe the same more fully, referring to the accompanyings drawings, in which—

Figure 1 is a side view of an armature, partly broken away, with my invention applied thereto. Fig. 2 is an end face view partly in section. Fig. 3 is an enlarged section on a line 3 3, Fig. 1. Fig. 4 is an enlarged section showing the wires in the grooves.

Like letters indicate like parts in each of the figures.

The letter $a$ designates an armature of any suitable size or construction, and $b$ designates the wires which are wound around said armature. The communicator $c$ is of the ordinary construction, being made up of a series of radial copper-plates mounted on the armature-shaft $d$. These copper plates of the commutator are insulated in the ordinary manner by means of the mica strips $e$. The commutator has the enlarged annular portion $f$, said annular portion having the outwardly-extending flanges $f'$ $f^2$. The flange $f'$ and the periphery of the annual portion $f$ have formed therein the grooves $g$. The depth of these grooves $g$ depends upon the number of wires which they are to receive. In the drawings I have indicated the groove as of a depth to receive two wires. The grooves $g$ are made of such width that the wires will fit snugly therein, the one on top of the other, the top wire projecting slightly above the periphery of the annular portion $f$. The wires $b$ are usually stripped of their insulation from the point where they enter the grooves $g$. After all the wires have been inserted in their respective grooves, a series of coils of the wire $h$ are wrapped around the space between the flanges $f'$ $f^2$ of the annular portion $f$ of the commutator, said wires acting to hold the armature-wires $b$ down within the grooves $g$. A suitable layer of insulating material $f^3$ is interposed between the wires $b$ and the wires $h$. In order that the wires $h$ may be wrapped very tight, I prefer to employ the same mechanism that is used for winding the armature. In this way a very secure manner of holding the armature-wires $b$ in place within the grooves $g$ is provided. Instead of a number of coils of wire $h$, a suitable band might be employed for holding the wires $b$ in place. The free ends of the wires $h$ may be secured in place by solder or other suitable manner.

By the above construction the wires $b$ are securely held in place, so that there is no liability of their becoming loose. This is of particular advantage where the motor is run at a high speed and is subjected to severe jarring action, such as they encounter on the electric railways.

What I claim as my invention, and desire to secure by Letters Patent, is—

In a motor or dynamo, the combination with the armature, of a commutator having outwardly projecting flanges and grooves formed in its periphery, and a band encircling said commutator between said flanges and adapted to retain the armature wires within said grooves, substantially as and for the purposes set forth.

In testimony whereof I, the said JOHN DICE, have hereunto set my hand.

JOHN DICE.

Witnesses:
ROBERT C. TOTTEN,
LOUISE TOTTEN.